US011115907B2

(12) United States Patent
Chen

(10) Patent No.: US 11,115,907 B2
(45) Date of Patent: Sep. 7, 2021

(54) USER EQUIPMENT BEHAVIOR USING CELL ACCESS RELATED INFORMATION

(71) Applicant: Google LLC, Mountain View, CA (US)

(72) Inventor: Teming Chen, Taipei (TW)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/640,657

(22) PCT Filed: Feb. 14, 2019

(86) PCT No.: PCT/US2019/018020
§ 371 (c)(1),
(2) Date: Feb. 20, 2020

(87) PCT Pub. No.: WO2019/161061
PCT Pub. Date: Aug. 22, 2019

(65) Prior Publication Data
US 2020/0359302 A1    Nov. 12, 2020

Related U.S. Application Data

(60) Provisional application No. 62/630,811, filed on Feb. 14, 2018.

(51) Int. Cl.
*H04W 48/12* (2009.01)
*H04W 76/11* (2018.01)
(Continued)

(52) U.S. Cl.
CPC ........... *H04W 48/12* (2013.01); *H04W 48/16* (2013.01); *H04W 48/20* (2013.01); *H04W 76/11* (2018.02); *H04W 84/042* (2013.01)

(58) Field of Classification Search
CPC ..... H04W 48/12; H04W 48/16; H04W 48/10; H04W 48/20; H04W 84/042;
(Continued)

(56) References Cited

U.S. PATENT DOCUMENTS

| 7,505,783 B2 | 3/2009 | Park et al. | |
| 2006/0166694 A1 * | 7/2006 | Jeong | H04W 48/16 455/525 |

(Continued)

FOREIGN PATENT DOCUMENTS

| EP | 3675567 | 7/2020 | |
| WO | WO-2018142303 A1 * | 8/2018 | ............ H04W 48/12 |

(Continued)

OTHER PUBLICATIONS

U.S. Appl. No. 62/564,483 (Priority Application for US 2020/0275361 by Ohlsson) (Year: 2017).*
(Continued)

*Primary Examiner* — Daniel Lai
(74) *Attorney, Agent, or Firm* — Colby Nipper PLLC

(57) ABSTRACT

Methods and systems directed to a user equipment accessing a wireless-communication cell are described. The methods and systems include a user equipment (110) selecting (805) a first wireless-communication cell (306) and receiving (815), from a base station (124) providing the first wireless-communication cell (306), a first system information block (SIB). Based on contents of an entry within the SIB that indicate a core network type of the first wireless-communication cell (306), the user equipment (110) selects (825) a second wireless-communication cell (304) and receives (835), from a second base station (122) providing the second wireless-communication cell (304), a second SIB.

20 Claims, 8 Drawing Sheets

(51) Int. Cl.
*H04W 48/16* (2009.01)
*H04W 48/20* (2009.01)
*H04W 84/04* (2009.01)

(58) Field of Classification Search
CPC ..... H04W 36/08; H04W 48/02; H04W 48/08;
H04W 76/10; H04W 24/02; H04W 48/14;
H04W 48/18; H04W 36/00; H04W
36/0022; H04W 36/0033; H04W 36/0055;
H04W 36/0083; H04W 36/14; H04W
88/08; H04W 36/0027; H04W 76/11;
H04W 88/06
See application file for complete search history.

(56) References Cited

U.S. PATENT DOCUMENTS

| | | | |
|---|---|---|---|
| 2008/0102896 A1 | 5/2008 | Wang et al. | |
| 2015/0208411 A1* | 7/2015 | Mochizuki | H04W 72/0453 |
| | | | 455/452.1 |
| 2015/0223258 A1* | 8/2015 | Jung | H04W 72/082 |
| | | | 455/452.1 |
| 2017/0078333 A1 | 3/2017 | Tevlin | |
| 2017/0094570 A1* | 3/2017 | Kim | H04W 36/0055 |
| 2017/0311290 A1 | 10/2017 | Adjakple et al. | |
| 2019/0021048 A1* | 1/2019 | Kadiri | H04W 16/14 |
| 2020/0015281 A1* | 1/2020 | Zhang | H04W 74/0833 |
| 2020/0275361 A1* | 8/2020 | Ohlsson | H04W 48/18 |

FOREIGN PATENT DOCUMENTS

| | | |
|---|---|---|
| WO | 2019024617 | 2/2019 |
| WO | 20190161061 | 8/2019 |

OTHER PUBLICATIONS

"3GPP TS 36.331", V15.0.1, Jan. 2018, 776 pages.
"Barring Legacy UEs from 5GC Only Cells", 3GPP TSG-RAN WG2 #100 Reno, Nevada, USA, Nov. 27-Dec. 1, 2017, 2017, 3 pages.
"Emergency Services Over 5GC via Untrusted non-3GPP Access", SA WG2 Meeting #125 Jan. 22-26, 2018, Gothenburg, Sweden, 2018, 11 pages.
"International Search Report and Written Opinion", PCT Application No. PCT/US2019/018020, dated Apr. 5, 2019, 18 pages.
"Preventing Legacy LTE UEs from Camping on eLTE Cells & PLMNs Connected to New 5G Core Network Only", 3GPP TSG-RAN2 Meeting #100 Reno, USA, Nov. 27-Dec. 1, 2017, 2017, 6 pages.
"Running 36.331 CR for E-UTRA Connected to 5GC", 3GPP TSG-RAN2 Meeting #100 Reno, USA, Nov. 27-Dec. 1, 2017, 2017, 26 pages.
"3GPP TS 24.501 V16.3.0", 3GPP TS 24.501 version 16.3.0, Dec. 2019, 645 pages.
"3rd Generation Partnership Project; Technical Specification Group Services and System Aspects; Security architecture and procedures for 5G system", 3GPP TS 33.501 version 16.1.0 Release 16, Dec. 2019, 202 pages.
"5G; Non-Access-Stratum (NAS) protocol for 5G System (5GS); Stage 3", 3GPP TS 24.501 version 15.1.0 Release 15, Oct. 2018, 406 pages.
"Third Generation Partnership Project; Technical Specification Group Services and System Aspects; Service requirements for the 5G system; Stage 1", 3GPP TS 22.261 version 16.10.0 Release 16, Dec. 2019, 72 pages.
Aboba, et al., "Extensible Authentication Protocol (EAP)", RFC Editor; Retrieved from https://www.rfc-editor.org/info/rfc3748, Jun. 2004, 67 pages.
Lin, et al., "Handling of Extensible Authentication Protocol Based Non-Access Stratum Authentication Failures", Technical Disclosure Commons; Retrieved from https://www.tdcommons.org/dpubs_series/3191, Apr. 23, 2020, 11 pages.
Son, "7 Deployment Scenarios of Private 5G Networks", Netmanias; Retrieved from https://www.netmanias.com/en/post/blog/14500/5g-edge-kt-sk-telecom/7-deployment-scenarios-of-private-5g-networks, Oct. 21, 2019, 11 pages.
"Foreign Office Action", EP Application No. 19707643.3, dated Mar. 1, 2021, 11 pages.
"Further considerations on the CN selection for E-UTRAN connected to 5G CN", 3GPP TSG-RAN WG2 Meeting #99bis, R2-1710789, Oct. 2017, 6 pages.
"International Preliminary Report on Patentability", Application No. PCT/US2019/018020, dated Aug. 18, 2020, 10 pages.
"Foreign Office Action", KR Application No. 10-2020-7023316, dated May 24, 2021, 16 pages.

* cited by examiner

USER EQUIPMENT BEHAVIOR USING CELL ACCESS RELATED INFORMATION

BACKGROUND

A base station that is part of a radio access network (RAN) provides a wireless-communication cell for a core network supporting the RAN. In general, multiple base stations may provide multiple, respective wireless-communication cells for one or more core networks. Each core network may be a same type of network, such as an Evolved Packet Core (EPC) network that supports 3rd Generation Partnership Project Long-Term Evolution (3GPP LTE) wireless communications or a Fifth-Generation Core (5GC) network that supports Fifth-Generation New Radio (5G NR) wireless communications.

In certain instances, a user equipment may be within a transmission range of multiple base stations and have access to multiple wireless-communication cells. However, in such instances, underlying core networks of the multiple wireless-communication cells may be different. For example, the user equipment may be within transmission range of a base station providing a wireless-communication cell for an EPC network and, at the same time, be within transmission range of another base station providing a wireless-communication cell for a 5GC network.

The user equipment may then select a wireless-communication cell and attach to a base station providing the wireless-communication cell. For example, when a user equipment powers on and detects multiple base stations providing multiple, respective wireless-communication cells, the user equipment selects from these wireless-communication cells to perform wireless communications. Another example includes when the user equipment is actively accessing the wireless-communication cell and services provided by the wireless-communication cell violate a criterion or performance threshold, compelling the user equipment to select another wireless-communication cell providing services that meet the criterion.

The user equipment selecting a wireless-communication cell, however, often relies on a received signal strength indicator (RSSI). A process relying on RSSI can fail to maintain continuity of wireless communications having sufficient bandwidth and can also lead to mismatches between layers of a wireless network stack shared by the user equipment and the base station providing the wireless-communication cell.

SUMMARY

This document discloses methods and systems directed to a user equipment accessing a wireless-communication cell. The methods and systems include the user equipment receiving, from a base station that provides a wireless-communication cell, a System Information Block (SIB). The presence (or absence) of an identifier within an entry of the SIB indicates to the user equipment a type of underlying core network associated with the wireless-communication cell.

Through determining the presence or absence of the identifier, the user equipment may access a wireless-communication cell that provides a desired underlying core network. Accessing the wireless-communication cell that provides the desired underlying core network yields multiple benefits, including (i) assuring that wireless communications maintain sufficient bandwidth and (ii) avoiding a mismatch amongst layers of a wireless network stack (shared by the user equipment and the base station providing the wireless-communication cell) that can result in contention amongst the layers.

Some aspects describe a method performed by a user equipment. The method includes the user equipment selecting a first wireless-communication cell. After receiving, from a first base station providing the first wireless-communication cell a first system information block (SIB), the user equipment determines that an identifier is absent from an entry within the first SIB. Responsive to determining that the identifier is absent from the entry within the first SIB, the user equipment selects a second wireless-communication cell and receives, from a second base station providing the second wireless-communication cell, a second SIB.

Other aspects describe another method performed by a user equipment. The other method includes the user equipment selecting a first wireless-communication cell and receiving, from a first base station providing the first wireless-communication cell, a first system information block (SIB). The user equipment determines that an identifier is present in an entry within the first SIB. Responsive to determining that the identifier is present within the entry of the first SIB, the user equipment bars access to the first wireless-communication cell.

Yet other aspects describe a user equipment. The user equipment includes a processor and a computer-readable storage media having a cell-access manager application. The cell-access manager application includes instructions that, when executed by the processor, direct the user equipment to select a first wireless-communication cell and receive, from a first base station providing the first wireless-communication cell, a first system information block (SIB). Execution of the instructions further directs the user equipment to determine that an identifier is absent from an entry within the first SIB and, in response, select a second wireless-communication cell. The execution of the instructions then directs the user equipment to receive, from a second base station providing the second wireless-communication cell, a second SIB.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, this summary should not be considered to describe essential features nor used to limit the scope of the claimed subject matter.

BRIEF DESCRIPTION OF THE DRAWINGS

The details of one or more aspects of a user equipment accessing a wireless-communication cell are described below. The use of the same reference numbers in different instances in the description and the figures indicate like elements.

DETAILED DESCRIPTION

Operating Environment

Figure 1:
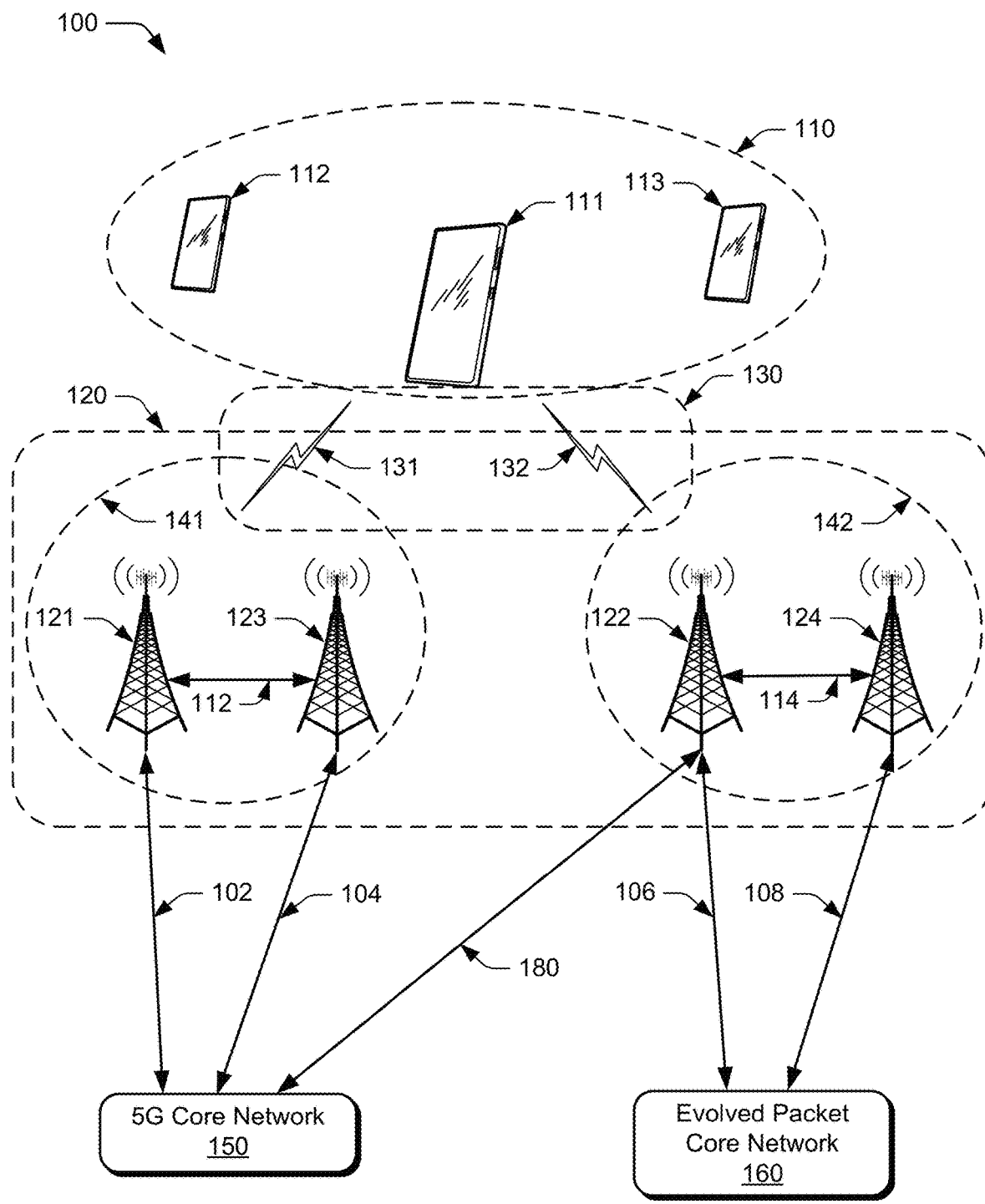
FIG. 1 illustrates an example operating environment in accordance with one or more aspects of a user equipment accessing a wireless-communication cell.

FIG. 1 illustrates an example environment 100, which includes multiple user equipment 110 (UE 110), illustrated as UE 111, UE 112, and UE 113. Each UE 110 can communicate with one or more base stations 120 (illustrated as base stations 121, 122, 123, and 124) through one or more links for wireless communications (wireless link 130), illustrated as wireless links 131 and 132. Wireless links, such as wireless links 130, 131, and 132, also sometimes referred to herein as a "radio link" when involving radio-frequency transmissions, include control communications or data communications, or both. In this example, the UE 110 is a smartphone. Although illustrated as a smartphone, the UE 110 may be any suitable computing or electronic device, such as a mobile communication device, a modem, cellular phone, gaming device, navigation device, media device, laptop computer, desktop computer, tablet computer, smart appliance, vehicle-based communication system, and the like. The base stations 120 (e.g., an Evolved Universal Terrestrial Radio Access Network Node B, E-UTRAN Node B, evolved Node B, eNodeB, eNB, Next Generation Node B, gNode B, gNB, or the like) may be implemented in a macrocell, microcell, small cell, picocell, or the like, or any combination thereof.

The base stations 120 communicate with the UE 110 via the wireless links 131 and 132, which may be any suitable type of wireless link. The wireless link 131 and 132 can include a downlink of data and control information communicated from the base stations 120 to the UE 110, an uplink of other data and control information communicated from the UE 110 to the base station 120s, or both. The wireless links 130 may include one or more wireless links or bearers implemented using any suitable communication protocol or standard, or combination of communication protocols or standards such as Third Generation Partnership Project Long-Term Evolution (3GPP LTE), Fifth-Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (RAN, Evolved Universal Terrestrial Radio Access Network, E-UTRAN, 5G NR RAN or NR RAN). The RANs 140 are illustrated as a NR RAN 141 and an E-UTRAN 142. The base stations 121 and 123 in the NR RAN 141 are connected to a Fifth-Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at interface 102 and at interface 104 respectively, to the 5GC 150. The first interface 102 and the second interface 104 each include an NG2 interface for control-plane signaling and an NG3 interface for user-plane data communications. The base stations 122 and 124 connect, at 106 and 108 respectively, to the EPC 160 via an Si interface for control-plane signaling and user-plane data communications. Optionally or additionally, if the base station 122 connects to the 5GC 150 and EPC 160 networks, the base station 122 connects to the 5GC 150 via an NG2 interface for control-plane signaling and via an NG3 interface for user-plane data communications, at 180.

In addition to connections to core networks, base stations 120 may communicate with each other. The base stations 121 and 123 communicate via an Xn interface at 112. The base stations 122 and 124 communicate via an X2 interface at 114.

The 5GC 150 includes an Access and Mobility Management Function 152 (AMF 152) that provides control-plane functions such as registration and authentication of multiple UE 110, authorization, mobility management, or the like in the 5G NR network. The EPC 160 includes a Mobility Management Entity 162 (MME 162) that provides control-plane functions such as registration and authentication of multiple UE 110, authorization, mobility management, or the like in the E-UTRA network. The AMF 152 and the MME 162 communicate with the base stations 120 in the RANs 140 and also communicate with multiple UE 110, via the base stations 120.

Within the operating environment 100, the base station 121 may provide a wireless-communication cell associated with the NR RAN 141, and the base station 123 may provide another cell associated with the NR RAN 141, where each cell of the NR RAN 141 covers a defined geographic region. Furthermore, the base station 121 and the base station 123 are connected to a same type of core network (e.g., the 5GC 150).

Also, within the operating environment 100, the base station 122 may provide a wireless-communication cell associated with the E-UTRAN 142 and the base station 124 may provide another cell associated with the E-UTRAN 142, where each cell of the E-UTRAN 142 covers a defined geographic region. Furthermore, the base station 122 and the base station 124 connect to another same type of core network (e.g., the EPC 160).

In some aspects and in accordance with wireless-communication protocols in 3GPP TS 36.331 V15.0.1 (2018-01) section 5.2.2.7, radio access networks (e.g., the NR RAN 141 or the E-UTRAN 142) may identify themselves to the UE 110 using an identifier known as a Public Land Mobile Network (PLMN) identifier. In respective instances, each of the base stations (e.g., each base station 121, 122, 123, or 124) may provide a respective, associated PLMN identifier to the UE 110 through an entry within a system information block (SIB) that is broadcast by each of the base stations. In some instances, the SIB may be a system information block type 1 (SIB1).

As an example, and in accordance with wireless-communication protocols as they evolve, the PLMN identifier may be included in an entry that corresponds to an InfoList entry associated with Fifth-Generation New Radio (5G NR) wireless-communication protocols (e.g., a cellAccessRelatedInfoList-5GC) and indicate that a network is a Fifth-Generation Core (5GC) network. As another example, and in accordance with wireless-communication protocols as they evolve, the PLMN identifier may be included in an entry that is an InfoList entry associated with Third Generation Partnership Project Long-Term Evolution (3 GPP LTE) wireless-communication protocols (e.g., a cellAccessRelatedInfoList) and indicate that a core network is an EPC network. As yet another example, and in accordance with wireless-communication protocols as they evolve, the PLMN identifier may be included in an entry that is an InfoList entry associated with Sixth-Generation (6G) wireless-communication protocols (e.g., a cellAccessRelatedInfoList-6G) that indicates network is a Sixth-Generation Core (6GC) network.

The PLMN identifier may also be used to indicate that a type of core network associated with the PLMN does not match a wireless-communication protocol associated with the InfoList entry. As a first example, the InfoList entry may be associated with a 3GPP wireless-communication protocol and indicate that the network is a 5GC network. As a second example, the InfoList entry may be associated with a 5G NR wireless-communication protocol and indicate that the core network is a 6GC network.

Example Devices

Figure 2:
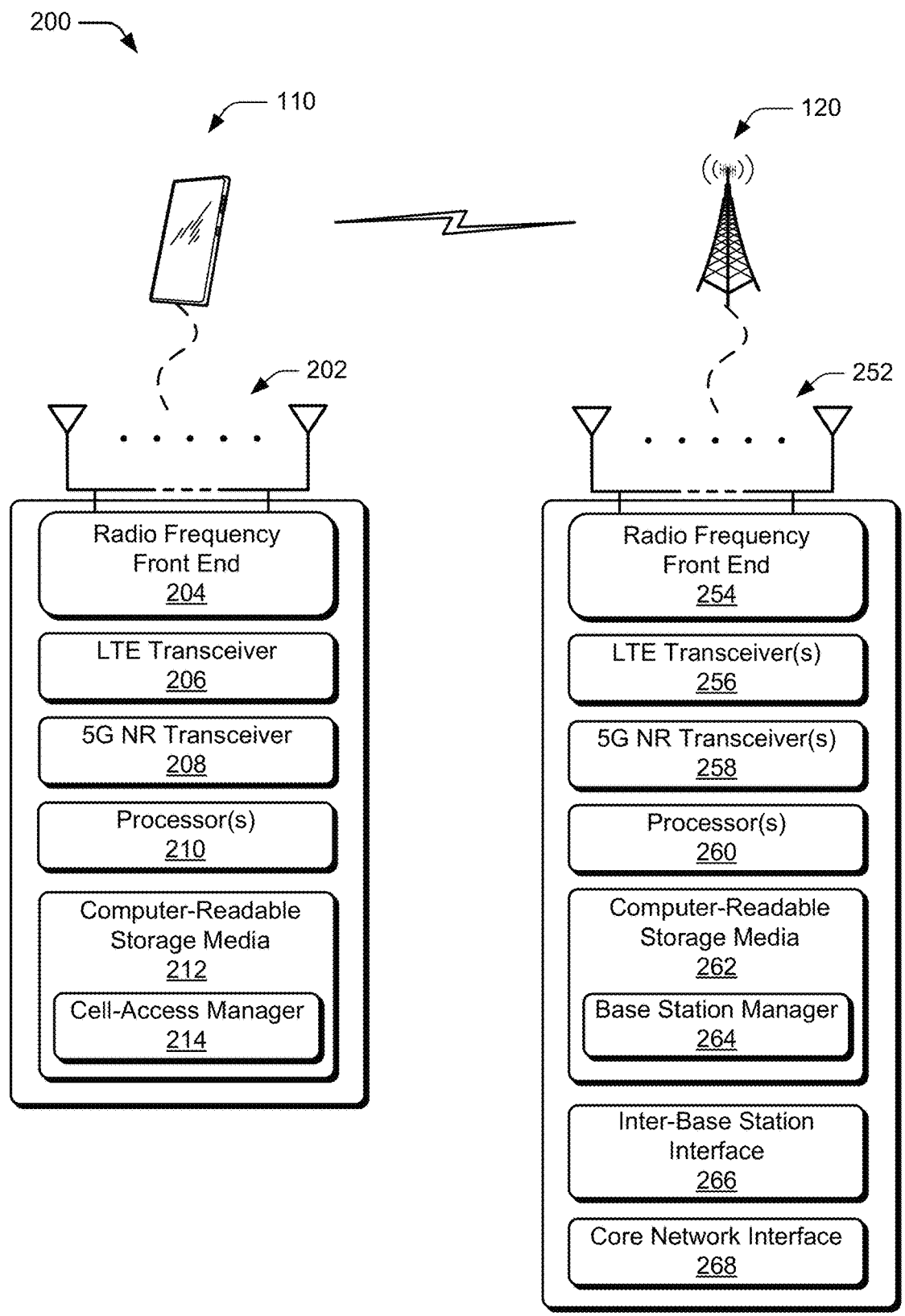
FIG. 2 illustrates example device diagrams in accordance with one or more aspects of a user equipment accessing a wireless-communication cell.

FIG. 2 illustrates an example device diagram 200 of the multiple UE 110 and the base stations 120. The multiple UE 110 and the base stations 120 may include additional functions and interfaces that are omitted from FIG. 2 for the sake of clarity. The UE 110 includes antennas 202, a radio frequency front end 204 (RF front end 204), an LTE transceiver 206, and a 5G NR transceiver 208 for communicating with base stations 120 in the NR RAN 141 and/or the E-UTRAN 142. The RF front end 204 of the UE 110 can couple or connect the LTE transceiver 206 and the 5G NR transceiver 208 to the antennas 202 to facilitate various types of wireless communication. The antennas 202 of the UE 110 may include an array of multiple antennas that are configured similar to or differently from each other. The antennas 202 and the RF front end 204 can be tuned to, and/or be tunable to, one or more frequency bands defined by the 3GPP LTE and 5G NR communication standards and implemented by the LTE transceiver 206, and/or the 5G NR transceiver 208. Additionally, the antennas 202, the RF front end 204, the LTE transceiver 206, and/or the 5G NR transceiver 208 may be configured to support beamforming for the transmission and reception of communications with the base stations 120. By way of example and not limitation, the antennas 202 and the RF front end 204 can be implemented for operation in sub-gigahertz bands, sub-6 GHZ bands, and/or above 6 GHz bands that are defined by the 3GPP LTE and 5G NR communication standards.

The UE 110 also includes processor(s) 210 and computer-readable storage media 212 (CRM 212). The processor 210 may be a single core processor or a multiple core processor composed of a variety of materials, such as silicon, polysilicon, high-K dielectric, copper, and so on. The CRM 212 described herein excludes propagating signals. The CRM 212 may include any suitable memory or storage device such as random-access memory (RAM), static RAM (SRAM), dynamic RAM (DRAM), non-volatile RAM (NVRAM), read-only memory (ROM), or Flash memory. The CRM 212 also includes executable code and instructions in the form of a cell-access manager 214. Alternately or additionally, the cell-access manager 214 may be implemented in whole or part as hardware logic or circuitry integrated with or separate from other components of the UE 110. In at least some aspects, the processor 210 executing the code of the cell-access manager 214 directs the UE 110 to perform one or more operations. Such operations may include detecting a wireless-communication condition that might be associated with the UE 110 accessing a first wireless-communication cell (such as a degradation in signal strength, a disruption, or an interference) and, in response, determining to select a second wireless-communication cell. Such operations may continue and include sending an access request to a base station providing the second wireless-communication cell, receiving a SIB from the base station providing the second wireless-communication cell, and determining from a PLMN identifier found in an entry within the SIB that a core network to which the base station is connected (e.g., a core network associated with the second wireless-communication cell) is a type of core network that is a same type of core network as that supported by the first wireless-communication cell.

The device diagram for the base stations 120, shown in FIG. 2, corresponds to the base station that provides the wireless-communication cell. Functionality of the base stations 120 may be distributed across multiple network nodes or devices and may be distributed in any fashion suitable to perform the functions described herein. The base stations 120 include antennas 252, a radio frequency front end 254 (RF front end 254), one or more LTE transceivers 256, and/or one or more 5G NR transceivers 258 for communicating with the UE 110. The RF front end 254 of the base stations 120 can couple or connect the LTE transceivers 256 and the 5G NR transceivers 258 to the antennas 252 to facilitate various types of wireless communication. The antennas 252 of the base stations 120 may include an array of multiple antennas that are configured similar to or differently from each other. The antennas 252 and the RF front end 254 can be tuned to, and/or be tunable to, one or more frequency bands defined by the 3GPP LTE and 5G NR communication standards, and implemented by the LTE transceivers 256, and/or the 5G NR transceivers 258. Additionally, the antennas 252, the RF front end 254, the LTE transceivers 256, and/or the 5G NR transceivers 258 may be configured to support beamforming, such as Massive-MIMO, for the transmission and reception of communications with the UE 110.

The base stations 120 also include processor(s) 260 and computer-readable storage media 262 (CRM 262). The processor 260 may be a single core processor or a multiple core processor composed of a variety of materials, such as silicon, polysilicon, high-K dielectric, copper, and so on. CRM 262 may include any suitable memory or storage device such as random-access memory (RAM), static RAM (SRAM), dynamic RAM (DRAM), non-volatile RAM (NVRAM), read-only memory (ROM), or Flash memory useable to store device data of the base stations 120.

CRM 262 also includes a base station manager 264. Alternately or additionally, the base station manager 264 may be implemented in whole or part as hardware logic or circuitry integrated with or separate from other components of the base stations 120. In at least some aspects, the base station manager 264 configures the LTE transceivers 256 and the 5G NR transceivers 258 for communication with the UE 110, as well as communication with a core network. The base station manager 264 may also, in some aspects, store data or information corresponding to a SIB having an entry containing a PLMN identifier. The base stations 120 include an inter-base station interface 266, such as an Xn and/or X2 interface, which the base station manager 264 configures to exchange user-plane and control-plane data between another base station 120, to manage the communication of the base stations 120 with the UE 110. The base stations 120 include a core network interface 268 that the base station manager 264 configures to exchange user-plane and control-plane data with core network functions and entities.

Figure 3:
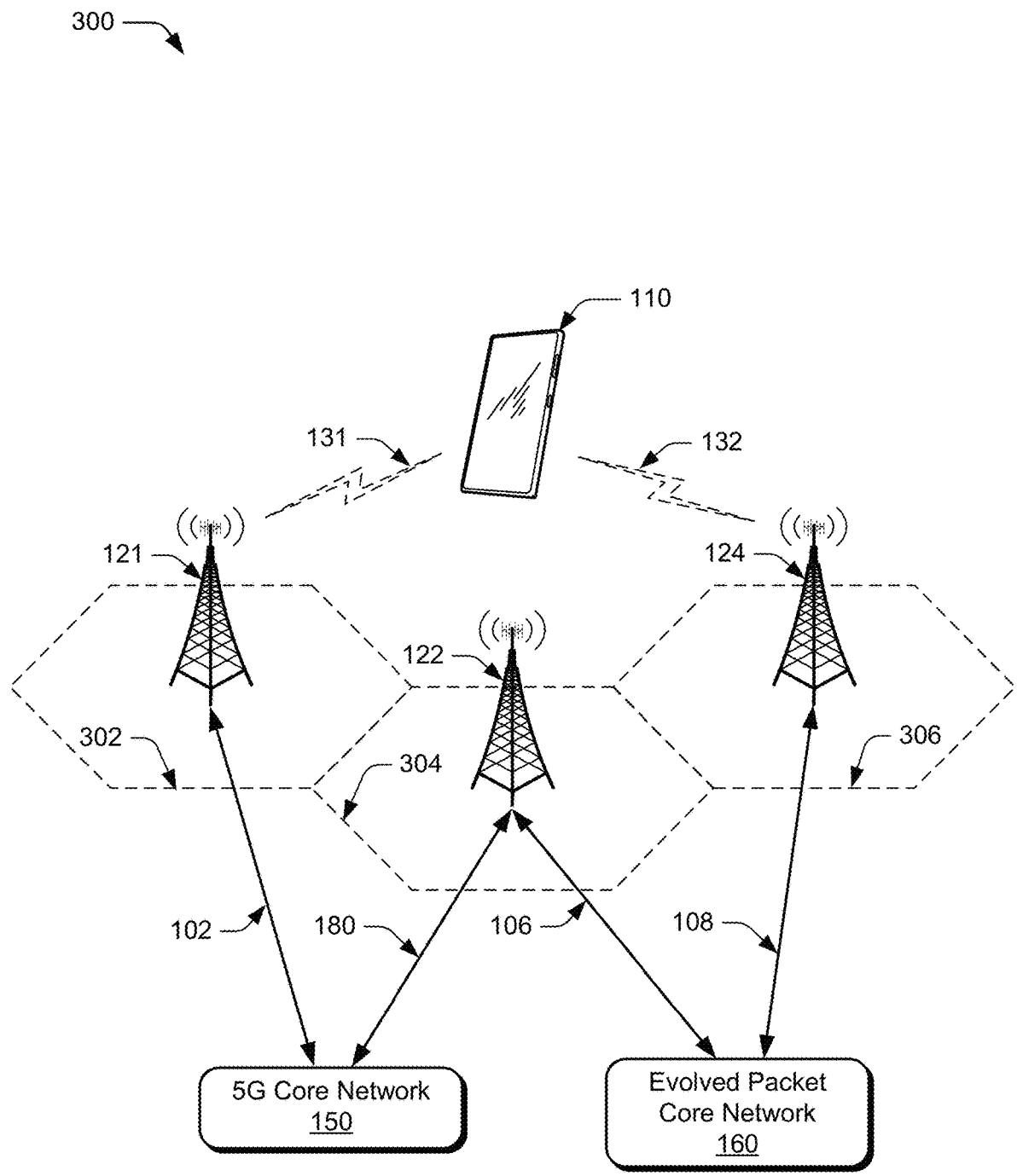
FIG. 3 illustrates example details of a scenario in accordance with one or more aspects of a user equipment accessing a wireless-communication cell.

FIG. 3 illustrates example details of a scenario 300 in accordance with one or more aspects of a user equipment accessing a wireless-communication cell. The user equipment may be the UE 110 of FIG. 1 and access respective wireless-communication cells by attaching to the base station 121, 122, or 123 of FIG. 1.

As illustrated in FIG. 3, the base station 121 provides a wireless-communication cell 302 (e.g., capable of accessing the 5GC network 150 using the interface 102), the base station 122 provides another wireless-communication cell 304 (e.g., capable of accessing the 5GC 150 using the interface 180 and the EPC 160 using the interface 106), and the base station 124 provides yet another wireless-communication cell 306 (capable of accessing the EPC 160 using the interface 108).

The UE 110 may verify a type of underlying core network of a wireless-communication cell through an entry contained in a SIB received from the base station 120. In the event the entry indicates to the UE 110 that a type of underlying network associated with a selected wireless-communication cell meets wireless-communication needs, the UE 110 may proceed with attaching to the respective base station providing the wireless-communication cell. In the event the entry indicates to the UE 110 that a type of underlying network associated with a selected wireless-communication cell does not meet wireless-communication needs, the UE 110 may bar the wireless-communication cell and not attach to the respective base station providing the wireless-communication cell. Such an entry within the SIB may associate a Public Land Mobile Network (PLMN) identifier to an underlying type of core network.

Figure 4:
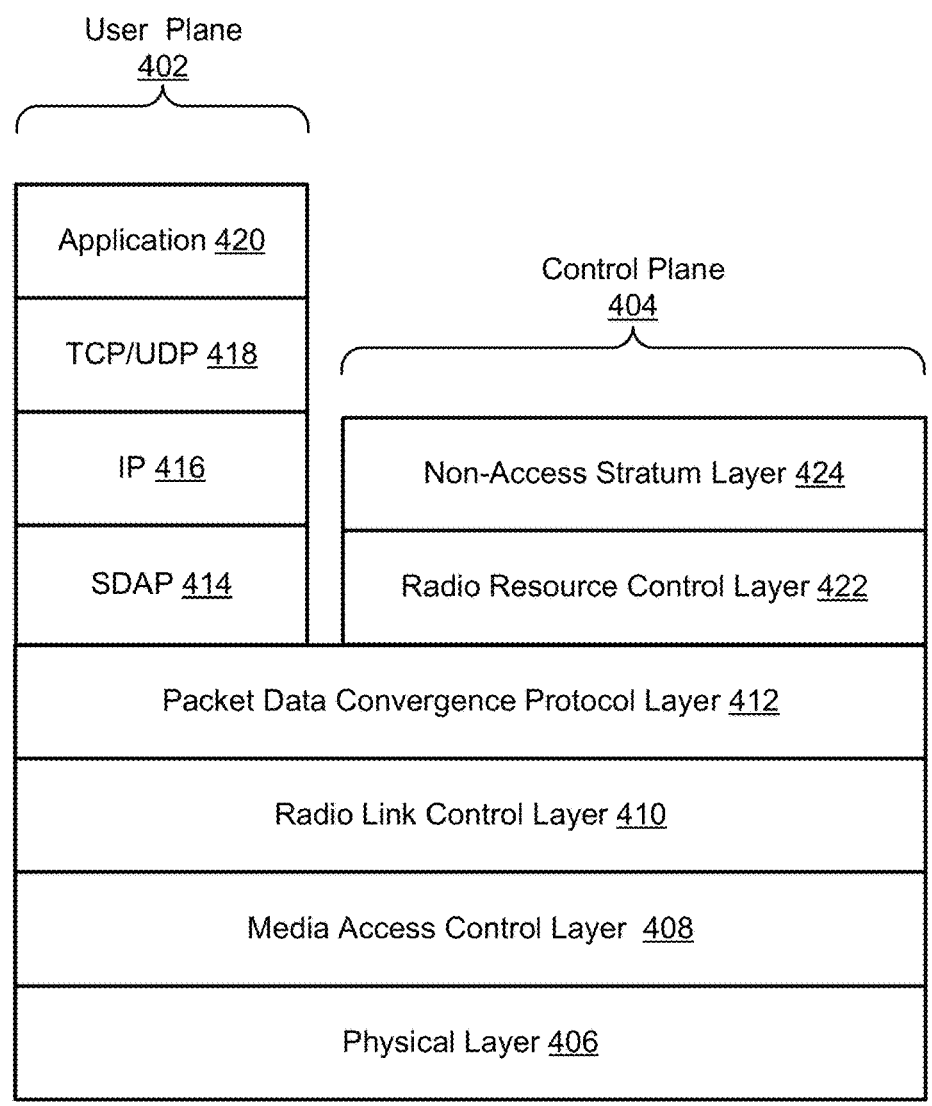
FIG. 4 illustrates example layers of a wireless network stack with which various aspects of a user equipment accessing a wireless-communication cell are implemented.

FIG. 4 illustrates example layers of a wireless network stack 400 with which various aspects of a user equipment accessing a wireless-communication cell are implemented. In general, the UE 110 and the base station 120 may each reference corresponding peer layers of the wireless network stack 400. In the event corresponding layers of the wireless network stack 400 do not synchronize with a same type of core network (e.g., a 5GC network or an EPC network), contention may exist, impacting wireless communications between the UE 110 and the base station 120. Furthermore, and with respect to the UE 110, one or more layers (e.g., peer layers) of the wireless network stack 400 may be included as part of the cell-access manager 214. In such instances, the one or more layers included as part of the cell-access manager 214 may include code for wireless-cell selection techniques performed by the UE 110.

The wireless network stack 400 includes a user plane 402 and a control plane 404. Upper layers of the user plane 402 and the control plane 404, share common lower layers in the wireless network stack 400. Wireless devices such as the UE 110 or base stations 120 implement each layer as an entity for communication with another device using the protocols defined for the layer. For example, a UE 110 uses a Packet Data Convergence Protocol (PDCP) entity to communicate to a peer PDCP entity in a base station 120 using the PDCP. The shared lower layers include a physical layer 406 (PHY layer 406), a Media Access Control layer 408 (MAC layer 408), a Radio Link Control layer 410 (RLC layer 410), and a Packet Data Convergence Protocol layer 412 (PDCP layer 412). The physical layer 406 provides hardware specifications for devices that communicate with each other. As such, the physical layer 406 establishes how devices connect to each other, assists in managing how communication resources are shared among devices, and the like.

The MAC layer 408 specifies how data is transferred between devices. Generally, the MAC layer 408 provides a way in which data packets being transmitted are encoded and decoded into bits as part of a transmission protocol.

The RLC layer 410 provides data transfer services to higher layers in the wireless network stack 400. Generally, the RLC layer 410 provides error correction, packet segmentation and reassembly, and management of data transfers in various modes, such as acknowledged, unacknowledged, or transparent modes.

The PDCP layer 412 provides data transfer services to higher layers in the wireless network stack 400. Generally, the PDCP layer 412 provides transfer of user plane 402 and control plane 404 data, header compression, ciphering, and integrity protection.

Above the PDCP layer 412, the wireless network stack splits into the user-plane stack 402 and the control-plane stack 404. The user plane 402 layers include an optional Service Data Adaptation Protocol layer 414 (SDAP layer 414), an Internet Protocol layer 416 (IP layer 416), a Transmission Control Protocol/User Datagram Protocol layer 418 (TCP/UDP layer 418), and an application 420 that transfers data. The optional SDAP layer 414 is present in 5G NR networks and maps a Quality of Service (QoS) flow for each data radio bearer and marks QoS flow identities in uplink and downlink data packets for each packet data session. The IP layer 416 specifies how the data from the application 420 is transferred to a destination node. The TCP/UDP layer 418 is used to verify that data packets intended to be transferred to the destination node reached the destination node, using either TCP or UDP for data transfers by the application 420. In some implementations, the user plane 402 may also include a data services layer that provides data transport services to transport application data, such as IP packets including web browsing content, video content, image content, audio content, social media content, and so forth.

The control plane 404 includes Radio Resource Control layer 422 (RRC layer 422) and a Non-Access Stratum layer 424 (NAS layer 424). The RRC layer 422 establishes and releases connections and radio bearers, broadcasts system information, performs power control, and so forth. The RRC layer 422 supports 3GPP LTE access but does not support non-3GPP LTE access (e.g., Wireless Local Area Network (WLAN)). The NAS layer 424 supports 3GPP LTE access and non-3GPP LTE access.

In the UE 110, each layer in both the user plane 402 and the control plane 404 of the wireless network stack 400 interacts with a corresponding peer layer or entity in a base station 120, a core network entity or function, and/or a remote service, to support user applications and control operation of the UE 110 in the NR RAN 141 or the E-UTRAN 142.

Example Methods

Example methods 500 and 600 are described with reference to FIGS. 5 and 6. The order in which the method blocks are described is not intended to be construed as a limitation, and any number of the described method blocks can be combined in any order or skipped to implement a method or an alternate method. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Entry-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
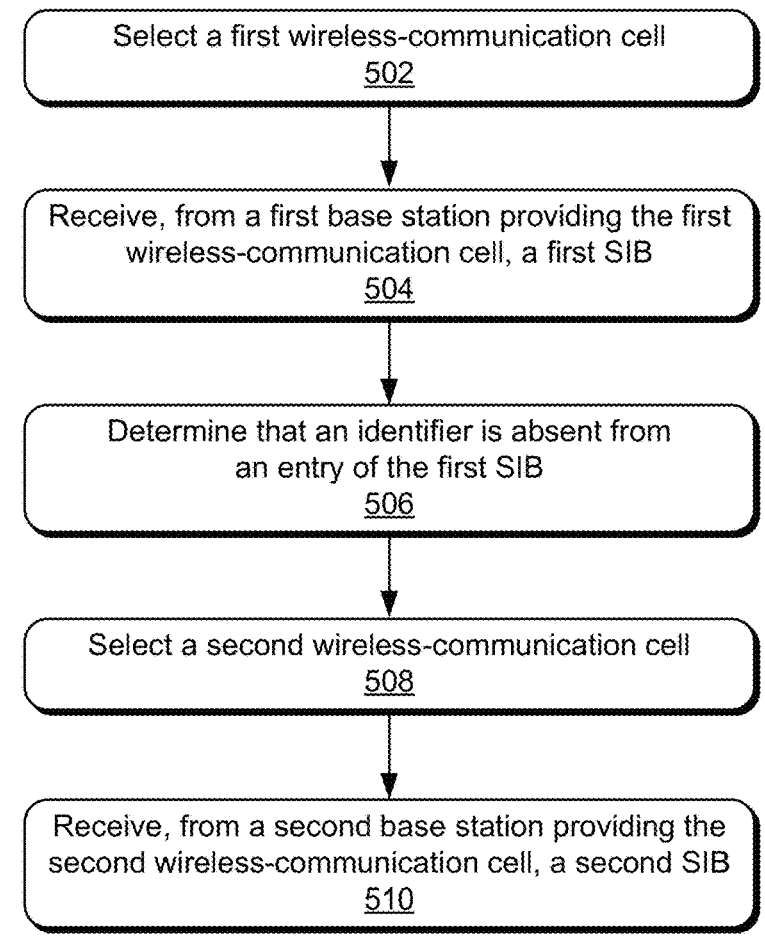
FIG. 5 illustrates an example method performed by a user equipment in accordance with one or more aspects directed to the user equipment accessing a wireless-communication cell.

FIG. 5 illustrates an example method 500 performed by a user equipment in accordance with one or more aspects directed to the user equipment accessing a wireless-communication cell. The user equipment may be the UE 110 of FIGS. 1, 2, and 3 performing the method through the processor 210 executing code and instructions of the cell-access manager 214.

At operation 502, the user equipment selects a first wireless-communication cell (e.g., the wireless-communication cell 306). The user equipment may trigger selection of the first wireless-communication cell during powering-on of the user equipment and the first wireless-communication cell may be one of multiple wireless-communication cells (e.g., the wireless-communication cells 302, 304, and 306) that are provided by respective base stations (e.g., the base stations 121, 123, and 122) that the user equipment detects during powering-on.

At operation 504, the user equipment receives, from a first base station providing the first wireless-communication cell, a first SIB. The first base station may actively broadcast the first SIB using, for example, a Physical Broadcasting Channel (PBCH). At operation 506, the user equipment determines that an identifier (e.g., a PLMN identifier associated with the first base station) is absent from an entry of the first SIB. In some instances, the entry may correspond to an InfoList that indicates a type of core network connected to the first wireless-communication cell is a Fifth-Generation Core (5GC) network, while in other instances the entry may correspond to another InfoList entry that indicates a type of core network connected to the first wireless-communication cell is an EPC network. Determining the absence of the identifier may include the processor 210 executing code contained within layers contained in the cell-access manger 214 that correspond to the NAS layer 424 and the RRC layer 422. Furthermore, and at operation 506, the SIB may be a system information block type 1 (SIB1).

At operation 508, and responsive to determining that the identifier is absent from the entry of the first SIB, the user equipment selects a second wireless-communication cell (e.g., the wireless-communication cell 302) and receives, from a second base station providing the second wireless-communication cell (e.g., the base station 121 providing the wireless-communication cell 302), a second SIB.

The example method 500 may extend to include additional operations, inclusive of (i) confirming that a second PLMN identifier is present in an entry of the second system information block, and (ii) sending, to the second base station, an attach request message to initiate a connection between the user equipment and the second base station. In general, the user equipment may continue "searching" for additional wireless-communication cells (beyond the first and second wireless-communication cells) until it confirms that is has selected a wireless-communication cell with a desired, underlying core network.

The example method 500 may apply to one or more wireless-communication cells having different combinations of types of underlying core networks. As a first non-limiting example, and as part of the example method 500, the first wireless-communication cell may have an underlying Evolved Packet Core (EPC) network and the second wireless-communication cell may have an underlying Fifth-Generation Core (5GC) network. As a second non-limiting example, either the first wireless-communication cell or the second wireless-communication cell may have an underlying Sixth-Generation Core (6GC) network.

Figure 6:
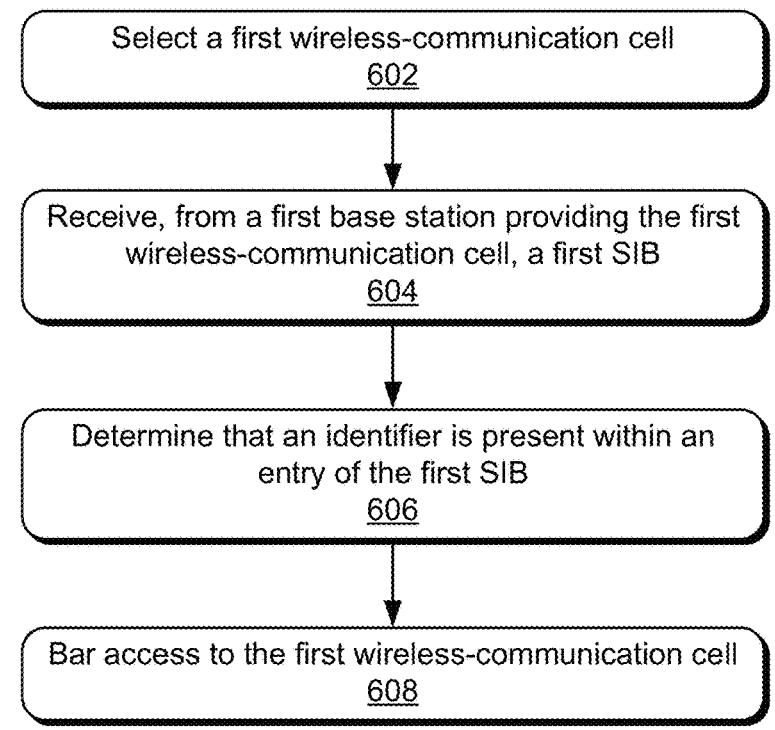
FIG. 6 illustrates another example method performed by a user equipment in accordance with one or more aspects directed to a user equipment accessing a wireless-communication cell.

FIG. 6 illustrates an example method 600 performed by a user equipment in accordance with one or more aspects directed to the user equipment accessing a wireless-communication cell. The user equipment may be the UE 110 of FIGS. 1, 2, and 3 performing the method through the processor 210 executing code and instructions of the cell-access manager 214.

At operation 602, the user equipment selects a first wireless-communication cell (e.g., the wireless-communication cell 306). The user equipment may trigger selection of the first wireless-communication cell during powering-on of the user equipment and the first wireless-communication cell may be one of multiple wireless-communication cells (e.g., the wireless-communication cells 302, 304, and 306) that are provided by respective base stations (e.g., the base stations 121, 123, and 122) that the user equipment detects during powering-on.

At operation 604, the user equipment receives, from a first base station providing the first wireless-communication cell a first SIB. The first base station may actively broadcast the first SIB using, for example, a Physical Broadcasting Channel (PBCH). At operation 606, the user equipment determines that an identifier (e.g., a PLMN identifier associated with the first base station) is present within an entry of the SIB. In some instances, the entry may correspond to an InfoList entry that indicates a core network is an EPC network. Determining that the identifier is present within the entry of the SIB may include the processor 210 executing code contained in the cell-access manger 214 that corresponds to the NAS layer 424 and the RRC layer 422. Furthermore, and at operation 606, the SIB may be a system information block type 1 (SIB1). At operation 608, and responsive to determining that the identifier is present within the entry of the SIB, the user equipment bars access to the first wireless-communication cell.

The example method 600 may extend to include additional operations, inclusive of (i) selecting a second wireless-communication cell and (ii) receiving, from a second base station providing the second wireless-communication cell, a second SIB.

The example method 600 may apply to one or more wireless-communication cells having different combinations of types of underlying core networks. As a first non-limiting example, and as part of the example method 600, the first wireless-communication cell may have a type of underlying core network that is an Evolved Packet Core (EPC) network and the second wireless-communication cell may have a type of underlying core network that is other than the EPC network.

Permutations of the methods 500 and 600 may augment other operations performed by the user equipment directed to "switching" wireless-communication cells. Such augmented operations may include the user equipment detecting wireless-communication conditions that impact an efficiency or effectiveness of wireless communications and searching for a wireless-communication cell having a same type of underlying core network as a prior wireless-communication cells. Furthermore, the order in which the operations of methods 500 and 600 are described are not intended to be construed as a limitation, and any number of the described operations can be combined in any order or with additional determination criteria as part of the user equipment accessing a wireless-communication cell.

Example Signaling and Control Transactions

Figure 7:
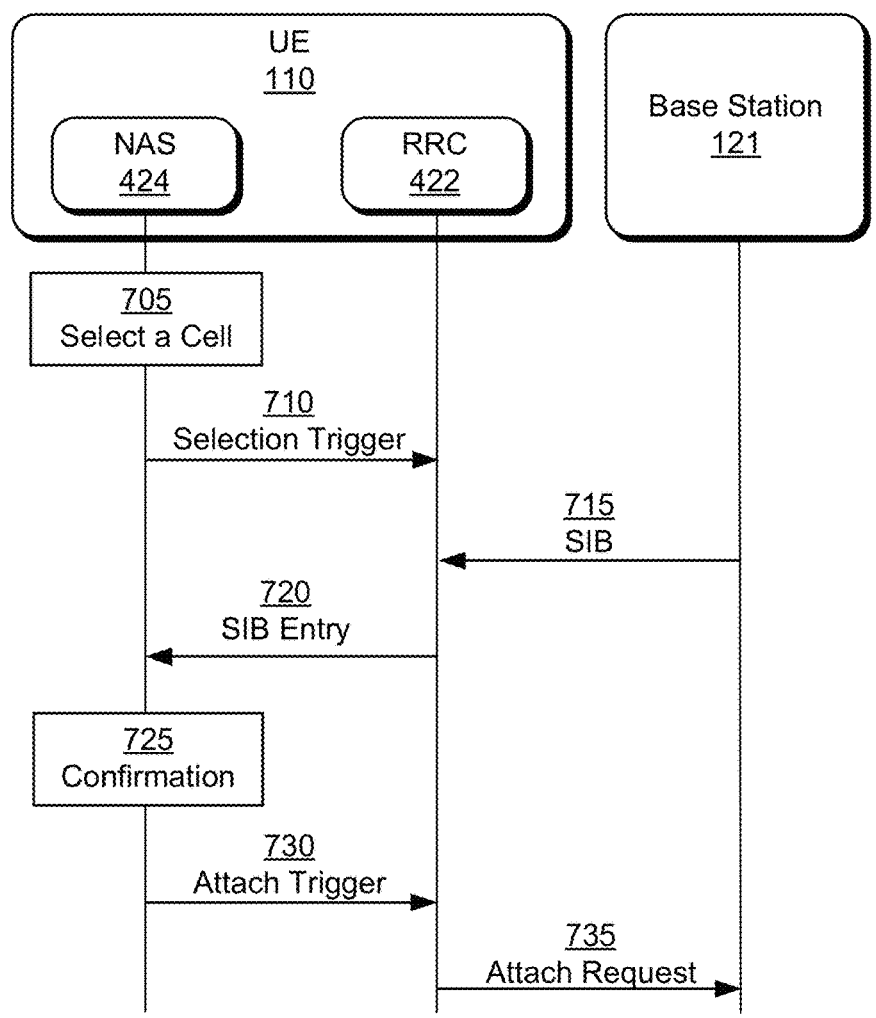
FIG. 7 illustrates examples of signal and control transactions associated with various aspects of a user equipment accessing a wireless-communication cell.

FIG. 7 illustrates example of signal and control transactions associated with various aspects of a user equipment accessing a wireless-communication cell. Although multiple scenarios of a user equipment accessing a wireless-communication cell are possible, FIG. 7 is illustrated in the context of a user equipment 110 powering-on to select a wireless-communication cell, such as wireless-communication cell 302 of FIG. 3. The signaling and control transactions include exchanges of information between the RRC layer 422 and the NAS layer 424 of the UE 110.

At 705, the NAS layer 424 (e.g., the processor 120 executing code of the cell-access manager 214 that includes the NAS layer 424) selects the wireless-communication cell 302 provided by the base station 121. At 710, the NAS layer 424 sends selection trigger information to the RRC layer 422. The RRC layer 422, at 715, receives a SIB that is broadcast from the base station 121.

At 720, the RRC layer 422 sends an entry (e.g., an InfoList entry) it derives from the SIB to the NAS layer 424. Based on contents of the entry, the NAS layer 424, at 725, confirms selection of the wireless-communication cell 302. Confirming the selection of the wireless-communication cell 302 at 725 may include comparing data within the entry (e.g., a presence or absence of a PLMN identifier associated with the wireless-communication cell 302) with other data (e.g., a listing of one or more PLMN identifiers) stored within a Subscriber Identity Module (SIM) or a computer-readable storage media (e.g., the CRM 212) that is part of the UE 110. At 730, the NAS layer 424 sends attach trigger information to the RRC layer 422. The RRC layer 422 then directs the UE 110 to transmit, at 735, an attach request message to the base station 121.

Figure 8:
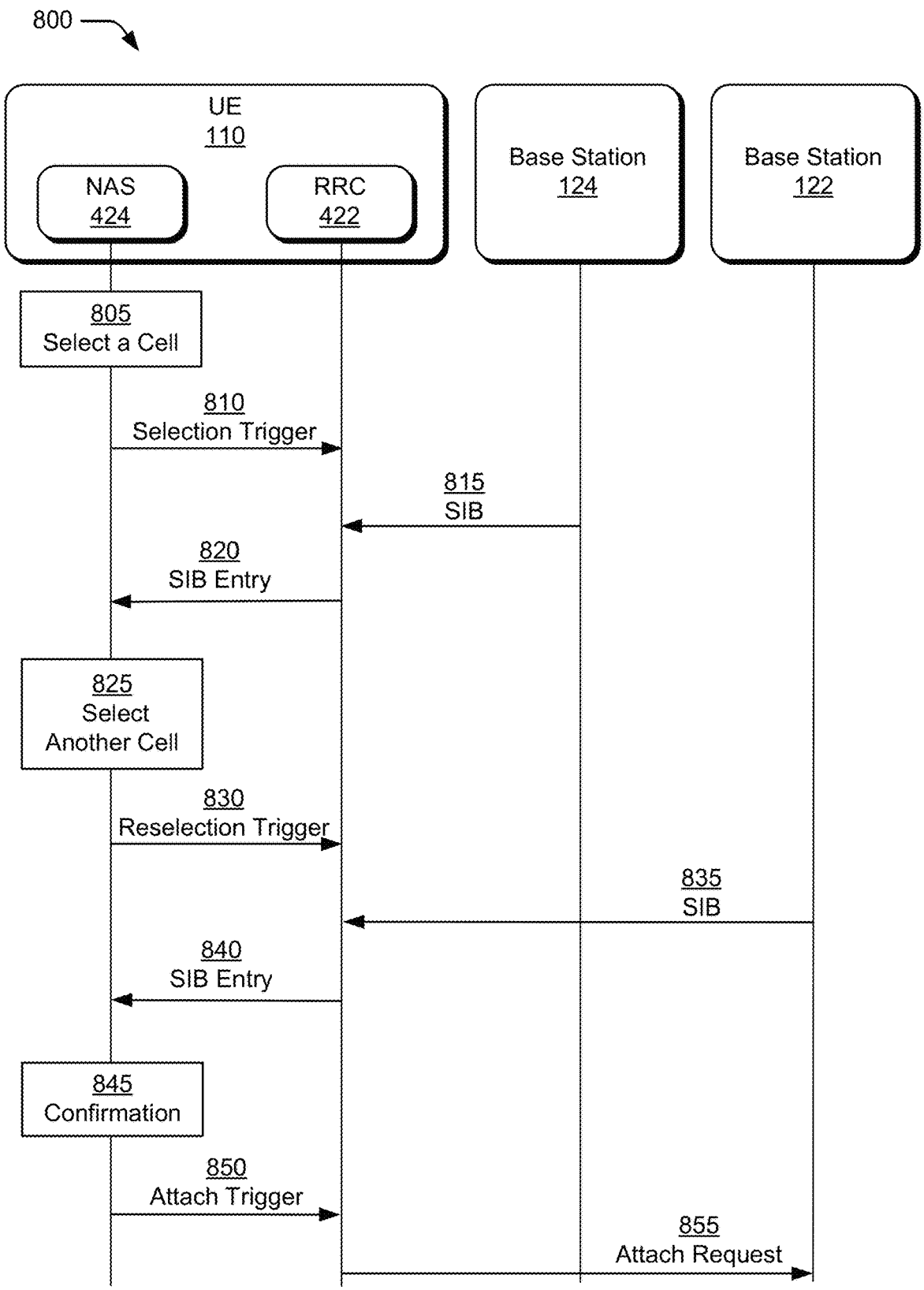
FIG. 8 illustrates other examples of signal and control transactions associated with various aspects of a user equipment accessing a wireless-communication cell.

FIG. 8 illustrates examples of signal and control transactions associated with various aspects of a user equipment accessing a wireless-communication cell. Although multiple scenarios of a user equipment accessing a wireless-communication cell are possible, FIG. 8 is illustrated in the context of a user equipment 110 performing a wireless-communication cell selection process where the UE 110 is making a selection between wireless-communication cells 306 and 304 of FIG. 3. The signaling and control transactions include exchanges of information between the RRC layer 422 and the NAS layer 424 of the user equipment 110.

At 805, the NAS layer 424 (e.g., the processor 120 executing code of the cell-access manager 214 that includes the NAS layer 424) selects the first wireless-communication cell 306 provided by the base station 124. At 810, the NAS layer 424 sends selection trigger information to the RRC layer 422. The RRC layer 422, at 815, receives a first SIB that is broadcast from the base station 124.

At 820, the RRC layer 422 sends a first entry (e.g., an InfoList entry) it derives from the first SIB to the NAS layer 424. Based on contents of the first entry (indicating that the wireless-communication cell 306 can access the EPC 160 but not the 5GC 150), the NAS layer 424 at 825 determines to select a second wireless-communication cell, e.g., the wireless communication cell 304 provided by the base station 122. Determining to select the second wireless-communication cell 304 at 825 may include comparing data of the first entry (e.g., a presence or absence of a PLMN identifier associated with the first wireless-communication cell 306) with other data (e.g., a listing of one or more PLMN identifiers) stored within a Subscriber Identity Module (SIM) or a computer-readable storage media (e.g., the CRM 212) that is part of the UE 110.

At 830, the NAS layer 424 sends reselection trigger information to the RRC layer 422. The RRC layer 422, at 835, receives a second SIB that is broadcast from the base station 122.

At 840, the RRC layer 422 sends a second entry (e.g., another InfoList entry) it derives from the second SIB to the NAS layer 424. At 845, the NAS layer 424 confirms the selection of the second wireless-communication cell 304. Confirming the selection of the second wireless-communication cell 304 at 845 may include comparing data of the second entry (e.g., a presence or absence of a PLMN identifier associated with the second wireless-communication cell 304) with other data (e.g., a listing of one or more PLMN identifiers) stored within a Subscriber Identity Module (SIM) or a computer-readable storage media (e.g., the CRM 212) that is part of the UE 110. At 850, the NAS layer 424 sends attach trigger information to the RRC layer 422. The RRC layer 422 then directs the UE 110 transmit at 855 an attach request message to the base station 122.

Although aspects of user equipment behavior using cell access related information have been described in language specific to features and/or methods, the subject of the appended claims is not necessarily limited to the specific features or methods described. Rather, the specific features and methods are disclosed as example implementations of user equipment behavior using cell access related information, and other equivalent features and methods are intended to be within the scope of the appended claims. Further, various different aspects are described, and it is to be appreciated that each described aspect can be implemented independently or in connection with one or more other described aspects.

EXAMPLES

Example 1

A method implemented by a user equipment, the method comprising:
  selecting, by the user equipment, a first wireless-communication cell;
  receiving, from a first base station providing the first wireless-communication cell,
  a first system information block (SIB);
  determining that an identifier is absent from an entry of the first SIB; and responsive to determining that the identifier is absent from the entry of the first SIB:
    selecting a second wireless-communication cell; and
    receiving, from a second base station providing the second wireless-communication cell, a second SIB.

Example 2

The method as recited by example 1, wherein the identifier is a Public Land Mobile Network (PLMN) identifier.

Example 3

The method as recited by example 2, wherein the entry indicates a type of core network.

Example 4

The method as recited by example 3, wherein the entry corresponds to an InfoList entry associated with Fifth-Generation New Radio (5G NR) wireless-communication protocols and indicates that the type of core network is a Fifth-Generation Core (5GC) network.

Example 5

The method as recited by example 3, wherein the entry corresponds to an InfoList entry associated with Third-Generation Partnership Project Long-Term Evolution (3GPP LTE) wireless-communication protocols and indicates that the type of core network is a Fifth-Generation Core (5GC) network.

Example 6

The method as recited by example 3, wherein the entry corresponds to an InfoList entry associated with Third-Generation Partnership Project Long-Term Evolution (3GPP LTE) wireless-communication protocols and indicates that the type of core network is an Evolved Packet Core (EPC) network.

Example 7

The method as recited by example 3, wherein the entry corresponds to an InfoList entry associated with Sixth-Generation wireless-communication protocols and indicates that the type of core network is a 6G Core (6GC) network.

Example 8

The method as recited by example 3, wherein the entry corresponds to an InfoList entry associated with Fifth-Generation New Radio (5G NR) wireless-communication protocols and indicates that the type of core network is a Sixth-Generation Core (6GC) network.

Example 9

The method as recited by example 1, wherein the first wireless-communication cell is accessible using a 3GPP LTE air interface and is connected to a Fifth-Generation Core (5GC) core network.

Example 10

The method as recited by example 1, wherein the SIB is a system information block type 1 (SIB1).

Example 11

A method implemented by a user equipment, the method comprising:
  selecting, by the user equipment, a first wireless-communication cell;
  receiving, from a first base station providing the first wireless-communication cell, a first system information block (SIB);
  determining that an identifier is present within an entry of the first SIB; and
  responsive to determining that the identifier is present within the entry of the first SIB, barring access to the first wireless-communication cell.

Example 12

The method as recited by example 11, wherein the identifier is a Public Land Mobile Network (PLMN) identifier.

Example 13

The method as recited by example 11, wherein the first SIB is a system information block type 1 (SIB1).

Example 14

The method as recited by example 13, wherein the entry within the first SIB indicates a type of core network supported by the first wireless-communication cell and to which the first base station is connected.

Example 15

The method as recited by example 14, wherein the type of core network is an Evolved Packet Core (EPC) network or a Fifth-Generation Core (5GC) network.

Example 16

The method as recited by example 14, wherein the type of core network is a Sixth-Generation Core (6GC) network.

Example 17

The method as recited by example 11, further comprising:
  responsive to barring the user equipment from accessing the first wireless-communication cell:
    selecting a second wireless-communication cell; and
    receiving, from a second base station providing the second wireless-communication cell, a second SIB.

Example 18

The method as recited by example 17, wherein a type of core network to which the second base station is connected is other than an Evolved Packed Core (EPC) network.

Example 19

A user equipment comprising:
  a processor; and
  computer-readable storage media having a cell-access manager application, the cell-access manager application comprising instructions that, upon execution by the processor, direct the user equipment to:
    select, by the user equipment, a first wireless-communication cell;
    receive, from a first base station providing the first wireless-communication cell, a first system information block (SIB);
    determine that an identifier is absent from an entry of the first SIB; and
    responsive to determining that the identifier is absent from the entry of the first SIB:
      select a second wireless-communication cell; and receive, from a second base station providing the second wireless-communication cell, a second SIB.

Example 20

The user equipment as recited by example 19, wherein the instructions are included in a Non-Access Stratum (NAS) layer and a Radio-Resource Control (RRC) layer.

What is claimed is:

1. A method implemented by a user equipment, the method comprising:
   selecting a first wireless-communication cell;
   receiving, from a first base station providing the first wireless-communication cell, a first system information block (SIB), the first SIB including a first entry;
   comparing a first identifier of the first entry to respective elements of a listing of identifiers stored within the user equipment, the first identifier of the entry associated to a type of core network connected to the first wireless-communication cell and the respective elements of the listing of identifiers associated to a selected type of core network;
   determining that the first identifier of the first entry fails to match at least one of the respective identifiers of the listing of identifiers; and
   responsive to determining that the first identifier of the first entry fails to match at least one of the respective elements of the listing of identifiers:
     selecting a second wireless-communication cell; and
     receiving a second SIB from a base station providing the second wireless-communication cell, the second SIB including a second entry.

2. The method as recited by claim 1, wherein the first entry and each identifier of the listing of identifiers is a Public Land Mobile Network (PLMN) identifier.

3. The method as recited by claim 1 wherein comparing the first identifier of the first entry to the respective elements of the listing of identifiers includes comparing an InfoList entry of the first SIB that indicates the first wireless-communication cell is connected to an Evolved Packet Core (EPC) network to the respective elements of the listing of identifiers, the respective elements of the listing of identifiers indicating that the selected type of core network is a Fifth-Generation Core (5GC) network.

4. The method as recited by claim 1, wherein comparing the first identifier of the first entry to the respective elements of the listing of identifiers includes comparing an InfoList entry of the first SIB that indicates the first wireless-communication cell is connected to a Fifth-Generation Core (5GC) network to the respective elements of the listing of identifiers, the respective elements of the listing of identifiers indicating that the selected type of core network is an Evolved Packet Core (EPC) network.

5. The method as recited by claim 1, wherein the first wireless-communication cell is accessible using a 3GPP LTE air interface.

6. The method as recited by claim 1, wherein the first SIB is a system information block type 1 (SIB1).

7. The method as recited by claim 1, wherein selecting the first wireless-communication cell is in response to the user equipment powering on.

8. The method as recited by claim 1, wherein the second SIB is a system information block type 1 (SIB1).

9. The method as recited by claim 1, further comprising:
   comparing a second identifier of the second entry to the respective elements of the listing of identifiers stored within the user equipment, the second identifier of the second entry associated to a type of core network connected to the second wireless-communication cell;
   determining that the second identifier of the second entry matches at least one of the respective identifiers of the listing of identifiers; and
   responsive to determining that the second identifier of the second entry matches at least one of the respective elements of the listing of identifiers, transmitting an attach request message to the second base station providing the second wireless-communication cell.

10. The method as recited by claim 9, wherein the second identifier is a PLMN identifier.

11. The method as recited by claim 10, wherein the second identifier of the second entry corresponds to an InfoList entry.

12. The method as recited by claim 11, wherein the InfoList entry relates to a cellAccessRelatedInfoList-5GC that is associated with Fifth-Generation New Radio (5G NR) wireless-communication protocols.

13. The method as recited by claim 11, where the InfoList entry relates to a cellAccessRelatedInfoList that is associated with Third Generation Partnership Project Long-Term Evolution (3GPP LTE) wireless communication protocols.

14. The method as recited by claim 1, wherein user equipment receives the first SIB through a signal that is broadcast by the first base station.

15. The method as recited by claim 1, wherein user equipment receives the second SIB through a signal that is broadcast by the second base station.

16. A user equipment comprising:
    a processor; and
    computer-readable storage media having a cell-access manager application, the cell-access manager application comprising instructions that, upon execution by the processor, direct the user equipment to:
    select a type of core network;
    select a first wireless-communication cell;
    receive, from a first base station providing the first wireless-communication cell, a first system information block (SIB), the first SIB including a first entry;
    compare a first identifier of the first entry to respective elements of a listing of identifiers stored within the user equipment, the first identifier of the first entry associated to a type of core network connected to the first wireless-communication cell and the respective elements of the listing of identifiers associated to the selected type of core network;
    determine that the first identifier of the first entry fails to match at least one of the respective identifiers of the listing of identifiers; and
    responsive to determining that the first identifier of the first entry fails to match at least one of the respective elements of the listing of identifiers:
      select a second wireless-communication cell; and
      receive a second SIB from a base station providing the second wireless-communication cell, the second SIB including a second entry.

17. The user equipment as recited by claim 16, wherein the instructions are included in a Non-Access Stratum (NAS) layer and a Radio-Resource Control (RRC) layer.

18. The user equipment as recited by claim 17, wherein the RRC layer is configured to receive the first SIB or the second SIB.

19. The user equipment as recited by claim 17, wherein the NAS layer is configured to send selection or reselection trigger information to the RRC layer.

20. The user equipment as recited by claim 16, wherein the listing of identifiers stored within the user equipment is stored within a Subscriber Identity Module (SIM).

\* \* \* \* \*